United States Patent [19]

Moeckel et al.

[11] 4,449,208

[45] May 15, 1984

[54] LITHOLOGIC STUDIES UTILIZING ACOUSTIC WAVE ATTENUATION

[75] Inventors: George P. Moeckel, Houston; George C. Wallick, Duncanville, both of Tex.

[73] Assignee: Mobil Oil Corporation, New York, N.Y.

[21] Appl. No.: 324,289

[22] Filed: Nov. 23, 1981

[51] Int. Cl.³ .......................... G01V 1/40; G01V 1/30
[52] U.S. Cl. ...................................... 367/30; 367/28; 367/47
[58] Field of Search .................. 367/28, 30, 32, 47, 367/56; 364/422; 166/250; 73/155

[56] References Cited

U.S. PATENT DOCUMENTS

| | | | |
|---|---|---|---|
| 2,887,172 | 5/1959 | Hardway | 367/30 |
| 3,622,969 | 11/1971 | Lebreton et al. | 367/130 |
| 3,781,784 | 12/1973 | Desbrandes | 367/30 |
| 4,102,185 | 7/1978 | Dowling et al. | 73/155 |
| 4,134,097 | 1/1979 | Cowles | 367/15 |
| 4,208,906 | 6/1980 | Roberts | 73/155 |
| 4,210,018 | 7/1980 | Brieger | 73/155 |

FOREIGN PATENT DOCUMENTS 0661470  5/1979  U.S.S.R. ................. 367/30

*Primary Examiner*—Nelson Moskowitz
*Attorney, Agent, or Firm*—Alexander J. McKillop; Michael G. Gilman; Charles J. Speciale

[57] ABSTRACT

A method for determining the lithology of subterranean structures based on attenuation of wave energy is disclosed which features a wave model based on a two-way solution to the wave equation rather than one-way solutions previously proposed. Rather than measuring amplitude of the wave as a function of its attenuation, energy flux density is measured which provides a two-way wave solution. In a preferred embodiment, pressure gradient measuring transducers are used to measure the energy flux density.

11 Claims, 3 Drawing Figures

LITHOLOGIC STUDIES UTILIZING ACOUSTIC WAVE ATTENUATION

FIELD OF THE INVENTION

This invention relates broadly to the field of exploration for oil, gas and other minerals. More particularly, the invention relates to a method whereby the attenuation of an acoustic wave in a porous subterranean layer may be measured to yield an indication of whether the pores are saturated with oil, gas or a mixture of the two.

BACKGROUND OF THE INVENTION

A primary concern of geophysical research has become the problem of distinguishing reliably between gas, oil and water in situ by acoustic means, as well as inferring the relative mineral concentration and the rock type, and the rock porosity and permeability. That is, if oil, gas or water is present in a given rock formation it is important to determine whether it can be extracted therefrom; i.e., the permeability or "connectedness" of the porous structure of the rock layer, which permits the gas or oil to be pumped out, is critical.

It is known that the acoustic velocity in liquid saturated porous rock can differ substantially from that in the same rock where a free gaseous phase is partially present. Two such layers in contact can thus account for a large reflection coefficient to an acoustic wave. However, the dependence of acoustic velocity on gas saturation is very weak in the range between 10 and 90 percent saturation, and hence is a poor quantitative measure of economic value of the minerals present.

Unpublished work indicates that a potentially more sensitive parameter to gas saturation is acoustic wave attenuation. It has been reported that the attenuation of an acoutic wave in a gas sand, for example, is at least twice that in a water sand. That is supported by theoretical work by Mavko et al, "Wave Attenuation in Partially Saturated Rocks" *Geophysics,* Vol. 44(2) p. 161 (1969), where it is demonstrated that the presence of both a gas and a liquid phase in pores is far more attenuating to seismic excitation than are pores fully saturated with either.

It has recently been demonstrated that attenuation is an order of magnitude more sensitive to saturation than is velocity and that partially saturated, fully saturated and dry rocks can be distinguished from one another by the relative attenuation of compressional and shear modes of vibration in the frequency range of 500 Hz to a few kHz. See Winkler et al, "Friction and Seismic Attenuation Rocks", *Nature,* 277 p. 528 (1979). Thus, in principle, attenuation could serve as an independent data point useful in determining the state of saturation of porous rocks as well as the identification of the lithology.

Seismic attenuation is often expressed in terms of the so-called "quality factor" Q. Q is usually defined as the maximum energy stored during a single cycle of sinusoidal deformation divided by the energy lost during the cycle. When the loss is large, however, this definition breaks down. It has instead been suggested that Q be defined in terms of the mean stored energy, W, and the energy loss, $\Delta W$, during a single cycle:

$$Q = \frac{4\pi W}{\Delta W}$$

When this definition is used, Q is related to the phase angle between stress and strain $\delta$ by:

$$\tan \delta = 1/Q$$

It has previously been suggested by Kjartansson that Q may be assumed to be frequency independent and that measurements of the attenuation of acoustic wave forms in rock layers may be suitable to provide an indication of Q. See Kjartansson, "Models for Frequency Dependent Q", *Stanford Rock Physics Progress Report,* 5, p. 88 (1978). The present inventors have found, however, that simple measurement of the attenuation of wave forms is not sufficient to measure Q regardless of whether Q is frequency independent. The best results possible with this method merely provide a value for Q in the single layer case, that is, in which Q is constant over the area of travel of the acoustic wave. Such a monolayer is not of substantial interest in lithologic studies, in which it is the locations of and lithology between the interfaces between various rock layers which are of geologic significance and which are sought to be detected. Accordingly, a method of determining Q in areas where the rock structure changes rapidly, as is frequently the case in formations of interest, is required.

OBJECTS OF THE INVENTION

It is therefore an object of the invention to provide a method for determining Q.

It is a further object of the invention to provide a method of determining Q which does not rely upon measurements of attenuation of acoustic waves.

A further object of the invention is to provide a tool for the measurement of Q in areas of rapidly changing lithologic character.

The ultimate object of the invention is to provide an improved method for exploration for oil, gas and other valuable minerals.

SUMMARY OF THE INVENTION

The above needs of the art and objects of the invention are fulfilled by the present invention which comprises a method for determining Q in various geological layers. An elongated measuring instrument comprising means for emitting an acoustic wave and means for detecting the acoustic wave is lowered into a borehole and gradually raised upwardly. At predetermined intervals, impulsive acoustic energy is emitted into the surrounding rock layer and its return is detected by transducers of plural types. Comparison of the outputs of the transducers are then used to determine the attenuation of the wave and thus to provide an indication of Q. An important novel feature is that the transducers provide an indication of pressure and pressure gradient over the extent of travel of the wave. This amounts to measurement of the energy flux through a given area and thus takes into account waves traveling in both directions, i.e., the primary wave as well as reflected waves. By comparison, the prior art techniques measured wave velocity and wave amplitude and hence were but one way measurements, which were inevitably rendered inaccurate by reflections and transmission from the interfaces between the layers of various types, which fact explains why these measurements were only suitable for use in the single layer situation of limited geologic significance.

BRIEF DESCRIPTION OF THE DRAWINGS

The invention will be better understood if reference is made to the accompanying drawings, in which.

DESCRIPTION OF THE PREFERRED EMBODIMENTS

Figure 1:
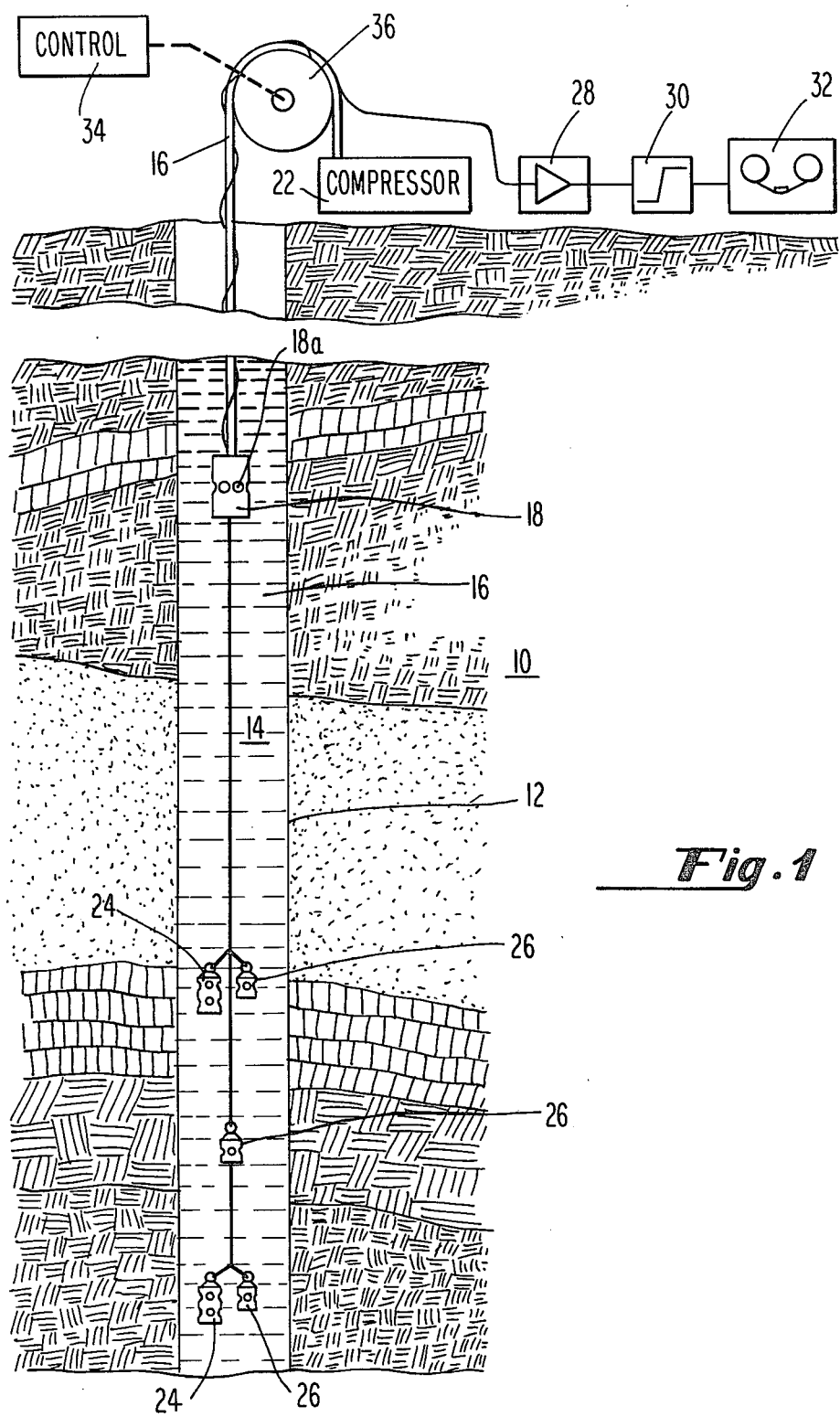
FIG. 1 shows the exploratory arrangement.

As discussed above, the prior art methods of determining Q relate to determination of the attenuation of the amplitude of the acoustic wave. These methods, since they do not distinguish between waves traveling in different directions, are inevitably incapable of yielding useful results in areas where waves are reflected from, e.g., interfaces between rock layers of interest. The present invention instead accounts for the two-way nature of wave propagation. In the preferred embodiment, measurement of rate of change of energy flux with distance is used as a measure of wave energy attenuation and hence as an indication of Q.

Prior to a detailed description of the apparatus used to make such measurements a presentation of the theory of operation thereof will be made. The theoretical presentation makes the assumption that the one-dimensional wave equation is sufficient to describe the progress of a compressional wave propagating in the media surrounding the borehole. Moreover, material properties are permitted to vary only with depth, (i.e., along the z axis). However, the results are not restricted to homogeneous layers with abrupt changes in material properties, but apply as well to arbitrary variations in properties. The governing equations for one-dimensional wave propagation in a visco-elastic medium are:

$$-\rho\omega^2 \hat{u} = \frac{\partial \hat{\sigma}}{\partial z} \text{ and } \hat{\sigma} = \hat{E}\frac{\partial \hat{u}}{\partial z}; \hat{u}(z,\omega) \equiv \int_{-\infty}^{+\infty} u(z,t)e^{-i\omega t}dt. \quad (1)$$

where $$\rho = \rho(z) \sim \text{mass density} \quad (2)$$

$\hat{u} = \hat{u}(z,\omega) \sim$ particle displacement $\hat{\sigma} = \hat{\sigma}(z,\omega) \sim$ stress or pressure $\hat{E} = \hat{E}(z,\omega) \sim$ stress/strain modulus We desire to work with particle velocity $\hat{v}(z,\omega)$ so it is necessary to replace $$\hat{u}(z,\omega) = \frac{\hat{v}(z,\omega)}{i\omega}, \quad (3)$$

then this results in $$\frac{\partial \hat{\sigma}}{\partial z} = i\rho\omega\hat{v}, \text{ with } \frac{\hat{E}}{\rho} \equiv C^2 \quad (4)$$

$$\frac{\partial \hat{v}}{\partial z} = \frac{i\omega}{\rho C^2}\hat{\sigma}$$

It will be appreciated that the term $\partial \hat{\sigma}/\partial z$ in Equation 4 represents the gradient of pressure, that is, the rate of change of pressure with displacement associated with the travel of the wave.

The wave velocity C in an elastic medium is equal to the phase velocity of propagation, while for a dissipative medium such as those of interest, in which waves undergo attenuation, C must be considered to be the complex velocity of propagation. We set $$H_{\alpha\beta} = \begin{vmatrix} 0 & 1 \\ 1 & 0 \end{vmatrix}; W_\alpha \equiv (\hat{\sigma}, \hat{v}) \quad (5)$$

and define $$F(z,\omega) \equiv H_{\alpha\beta}W^*_\alpha W_\beta$$

where the "*" denotes the complex conjugate. $F(z,\omega)$ is the flux of wave energy through a unit area; computation shows that $$F(z,\omega) = (\hat{\sigma}^*\hat{v} + \hat{\sigma}\hat{v}^*). \quad (6)$$

Substitution of equations 4 in equation 6, permits the computation:

$$\frac{\partial F}{\partial z} = \left[\frac{\partial \hat{\sigma}^*}{\partial z}\hat{v} + \hat{\sigma}^*\frac{\partial \hat{v}}{\partial z} \quad \frac{\partial \hat{\sigma}}{\partial z}\hat{v}^* + \hat{\sigma}\frac{\partial v^*}{\partial z}\right]$$

$$= \left[(i\rho\omega\hat{v})^*\hat{v} + \hat{\sigma}^*\left(i\frac{\omega}{\rho C^2}\hat{\sigma}\right) + (i\rho\omega\hat{v})\hat{v}^* + \hat{\sigma}\left(\frac{i\omega\hat{\sigma}}{\rho C^2}\right)^*\right],$$

For the absorptive material $$C = \mathfrak{C}(z,\omega) = \frac{c(z,\omega)}{1 - i\tan\Omega(z,\omega)}; \tan\Omega(z,\omega) \equiv \tan\frac{1}{2}\tan^{-1}\frac{1}{Q(z,\omega)} \quad (8)$$

and $c(z,\omega)$ is the phase velocity. Since the mass density $\rho$ is always a real quantity, $$\frac{\partial F}{\partial z} = \left[\frac{i\omega}{\rho(\mathfrak{C})^2}|\hat{\sigma}|^2 - \frac{i\omega}{\rho(\mathfrak{C}^*)^2}|\hat{\sigma}|^2\right] = \quad (9)$$

$$\frac{i\omega}{\rho}|\hat{\sigma}|^2\left(\frac{1}{(\mathfrak{C})^2} - \frac{1}{(\mathfrak{C}^*)^2}\right).$$

Replacement of Equation 8, into Equation 9 leads to the result $$\frac{\partial F}{\partial z} = \frac{4\omega}{\rho c^2}\tan\Omega |\hat{\sigma}|^2. \quad (10)$$

We can integrate Equation 10 over the interval [$z_1$, $z_2$] to obtain $$F(z_2,\omega) - F(z_1,\omega) = 4\omega \int_{z_1}^{z_2} \frac{\tan\Omega(z,\omega)}{\rho(z)c^2(z,\omega)}|\hat{\sigma}(z,\omega)|^2 dz \quad (11)$$

Hereafter, we use the symbol $\hat{p}$ and $\hat{\sigma}$ and recall that $\hat{p}(z,\omega) \equiv \hat{\sigma}(z,\omega) \sim$ Total Pressure $\hat{v} = \hat{V}(z,\omega) \sim$ Total particle velocity The quantity tan $\Omega$, the loss tangent, is an equivalent measure of the material dissipation factor Q, as indicated by equation 8. The quantity $\hat{\sigma}$, as used in the evaluation of the integral of equation 10 in equation 11 may be taken to be the pressure taken at the center of the interval $[z_1, z_2]$ or may be the average of plural measurements, for increasing accuracy. In the preferred embodiment, the spacing of the sensors, which amounts to the interval $[z_1, z_2]$ is such that the pressure Q does not vary significantly over this distance.

It will be appreciated that Equation 11 contains only total velocity and pressure, which may be measured. That is, there is no distinction drawn between the upcoming and downgoing components of $\hat{p}(z,\omega)$ (the stress) nor between those of $\hat{v}(z,\omega)$. Hence, evaluation of equation 11 requires values for the density $\rho(z)$, $c(z,\omega)$ the phase velocity, $\hat{v}(z,\omega)$, the particle velocity and $\hat{p}(z,\omega)$ the actual pressure. $\rho$ and C may be obtained from conventional density and sonic velocity logs, as is well known by those skilled in the art. Assuming for the moment that $\hat{v}$ and $\hat{p}$ may likewise be recorded by a suitable tool, equation 11 can be used to measure the deviation from the elastic conservation rule i.e., $F(z_2,\omega) - F(z_1,\omega) = 0$, in the interval $[z_1, z_2]$. According to equation 10, this deviation is directly proportional to the loss tangent, tan $\Omega$, which in turn is a measurement of the material dissipation factor Q as indicated by equation 8. Thus, if we denoted by $$<\tan \Omega> \quad (12)$$

an average constant value of tan $\Omega$ in $[z_1, z_2]$, at frequency $\omega_1$, we can express Equation 11 in the form $$4\omega_1 <\tan \Omega> \int_{z_1}^{z_2} \frac{|\hat{p}(z,\omega_1)|^2 dz}{\rho(z)c^2(z,\omega_1)} \simeq F(z_2,\omega_1) - F(z_1,\omega_1) \quad (13)$$

where $$F(z,\omega) = \hat{p}^*(z,\omega)\hat{v}(z,\omega) + \hat{p}(z,\omega)\hat{v}^*(z,\omega).$$

This result shows that the value for $<\tan \Omega>$ may be obtained provided $\hat{v}$ and $\hat{p}$ are recorded at the two depths $z_1, z_2$, together with pressure records made at locations between $z_1$ and $z_2$, all these receivers being associated with a single shot. Tools for recording the pressure $\hat{p}$ are presently standard equipment. However, the requirement of a geophone for measuring the actual particle velocity $\hat{v}$ presents difficulty. It would be possible to clamp a geophone to the walls of the borehole and measure velocity in this manner but this would be difficult to implement in the well-logging operation. Moreover, the frequency response of such a velocity geophone might well not be compatible with that of the pressure geophone. One possibility would be to take the time derivative of the output of a shear wave-detecting transducer, which will represent particle velocity. However, while equation 13 calls for velocity measurements, which would be ideal, a velocity geophone can be synthesized from computation of the gradient of pressure, thus:

$$\hat{v}(z,\omega) = \frac{-i}{\rho\omega} \cdot \frac{\partial \hat{p}}{\partial z} \quad (14)$$

Such a pressure gradient could be achieved by designing a geophone to measure the pressure gradient directly or could be estimated through a properly configured plurality of pressure geophones.

Equation 13 can be utilized at several frequencies to obtain $<\tan \Omega>$ as a function of frequency. If Q were independent of frequency in the bands considered, the redundant information thus obtained might instead be used to make a statistical estimate of Q.

Figure 2:
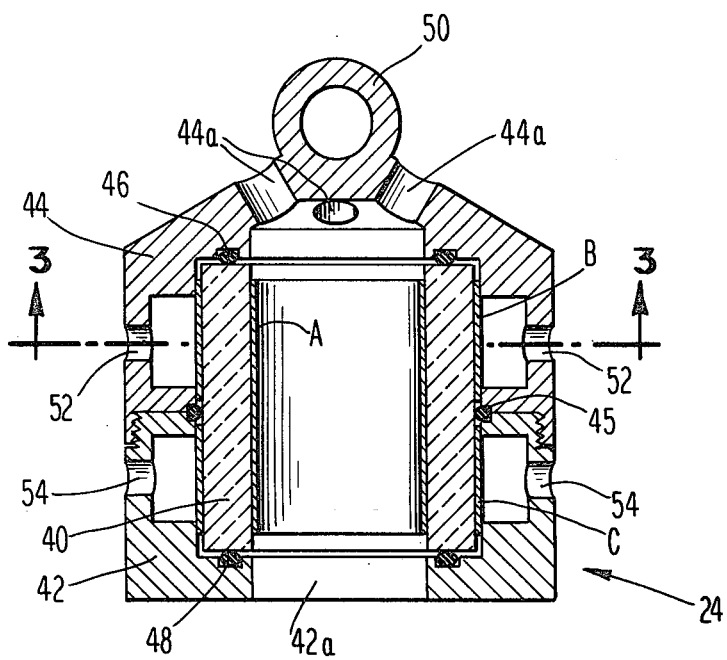
FIG. 2 shows a cross-sectional view of a geophone useful in the method of the invention.
Figure 3:
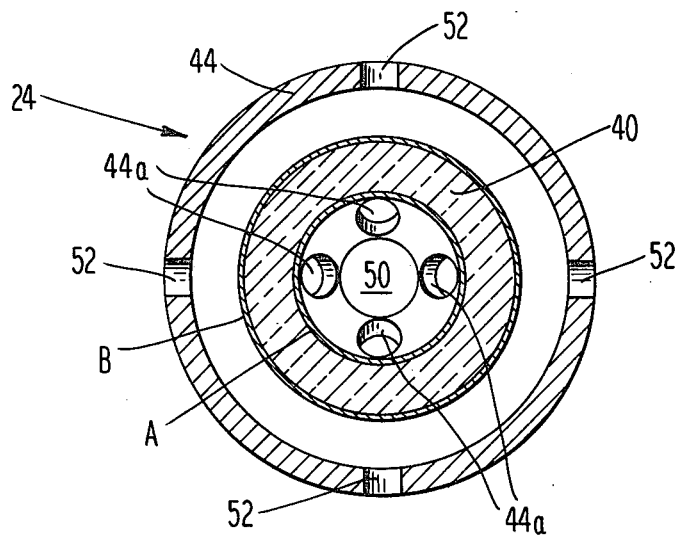
FIG. 3 shows a second cross-sectional view taken on the line 3—3 of FIG. 2.

A schematic representation of the arrangement used to practice the method of the invention is shown in FIG. 1, while cross-sectional views of a pressure gradient sensor which might be used in the process are shown in FIGS. 2 and 3. FIG. 1 shows a cross-sectional view of the earth 10 showing various rock layers and having a borehole 12 filled with a drilling mud 14 bored therein. Within the borehole 12 is suspended a cable 16 having means for imparting acoustic energy to the earth shown generally at 18; this might comprise a cylinder adapted to be filled with compressed air by means of a hose 20 supplied by a compressor 22 and fitted with ports 18A to release an acoustic wave into the earth via the mud 14 upon energization by a control signal. Also suspended from the cable 16 are at least two pressure gradient sensors 24 and at least 3 pressure sensors 26. As noted, the two pressure gradient sensors 24 are disposed together with two pressure sensors 26 defining the interval $[z_1, z_2]$, while the third pressure sensor 26 is disposed therebetween. Upon detection of acoustic waves output by the energy source 18, signals output by sensors 24 and 26 are passed along the cable 16, are received at the surface of the earth 10 and passed through various conventional elements such as amplifiers 28 and filters 30 and are recorded on recorders 32. The signals may additionally be converted from analog to digital form at this point if convenient. The exploratory "string", suspended from a pulley 36, is then generally raised on the order of a few feet (that is, a distance less than that separating the pressure gradient and pressure sensor pairs 24, 26 from one another) whereupon another impulse is imparted to the drilling mud 14 by the energy source 18 and the process repeated. It will be appreciated by those skilled in the art that the acoustic energy input to the drilling mud 14 radiates generally outwardly in all directions and is absorbed to varying degrees by the various layers or subterranean structures shown schematically in FIG. 1. As noted, various sorts of subterranean layers have varying absorbtion coefficients and these are indicative, inter alia, of whether or not porous subterranean structures are saturated and if so, whether with gas, liquid or a mixture of both. This may serve as an indication of the general lithology of the area as well as being a specific indication of the presence of valuable minerals.

As noted above, the acoustic waves imparted to the mud 14 tend to be reflected to varying degrees at the interfaces between the various different layers in accordance with well-known wave principles: where the medium of propagation of a wave changes, some fraction of the wave is reflected; each reflection effects a change in wave amplitude. The signals recorded by the pairs of detectors 24 and 26 will, for a complex structure, represent the superposition of many downgoing and up-coming waves. Any difference in amplitude of the two recorded signals must thus be associated with the structure over an interval several times the distance between the pairs rather than only with the media between the two pairs. The prior art amplitude detection Q-determination methods must, of necessity, make this latter association, since they do not provide sufficient information to permit the decoding of the complex wave pattern. Therefore, such amplitude detecting schemes are at best only useful to yield a value for Q in a homogeneous medium which is of little or no actual geologic interest.

Accordingly, the present invention provides means for detecting the actual energy flux through a given area by comparison of two such measurements, e.g., between the pressure gradient/pressure geophone pair 24/26 closest to the energy source 18 and that further away. This yields a result proportional to Q for the interval between the pairs of geophones.

As discussed above, it would be ideal from the theoretical point of view to have a geophone suitable for sensing the actual particle velocity in the method of determination of Q discussed above. However, actual measurement of particle velocity requires direct coupling of the geophone to the particle itself which would necessitate some sort of geophone which clamped itself to the wall of the borehole 12. This would be difficult to implement and inordinately complex of operation. Hence, a means for determining the pressure gradient at a particular location is used. A geophone 24 which might be suitable for use for this purpose is shown in FIGS. 2 and 3, FIG. 3 being a cross-section taken along the line 3—3 of FIG. 2. A generally hollow cylinder 40 of piezoelectric material is enclosed within a metal housing comprised of two parts 42 and 44. Its ends are sealed by O-rings 46 and 48. The two halves of the housing 42 and 44 are threaded together thus sealing the piezoelectric tube 40 in place. The entire structure may be supported by a ring 50 formed integrally with the upper portion 44 of the housing. Both upper and lower portions of the housing are provided with ports 52 and 54 respectively through which the drilling mud is permitted to pass, thus being coupled to the piezoelectric tube 40. In the embodiment shown in FIG. 2, the mud would directly contact the wall of the piezoelectric tube 40. This might not be desirable in practice; it will be understood that a rubber diaphragm or other means for communicating the pressure to the piezoelectric tube 40 without contamination might be interposed. It will be understood by those skilled in the art that if conductive materials are disposed on opposing surfaces of a piezoelectric material and a pressure wave is input to the piezoelectric material, a voltage will be developed across the opposing conductive surfaces. In the present case, a first conductive surface A might be disposed on the inside of the tube 40 and second and third separate conductive surfaces B and C provided on the outside surface of the tube opposed to the inside surface and communicating with the ports 52 and 54; an O-ring 45 might be used to separate surfaces B and C. In this way if the voltage of points B and C were separately measured with respect to point A, if there were a pressure gradient between the upper and lower ports 52 and 54 respectively, points B and C would show a voltage relative to one another with reference to point A at e.g., ground potential. Upper and lower orifices 44a and 42a allow the mud to contact inner conductor A to provide a reference value for pressure. This could be used to derive a signal indicative of the pressure gradient over the distance between the centers of the ports 52 and 54. This value could in turn be used in calculation of the integral of Equation 11 to yield a value for Q; the remaining inputs to the equation 11 are readily derivable in accordance with prior art teachings.

It will be appreciated that what is essentially shown in FIG. 2 is a combination of two pressure sensors disposed in very close proximity to one another and using the same piece of piezoelectric material referenced to a common ground. The distinction between this structure and the use of two identical piezoelectric transducers disposed in close proximity to one another is that such a pair would require very careful zero adjustment and balancing before an accurate value for the gradient of the pressure could be derived. It will be appreciated by those skilled in the art that the actual value of the pressure gradient will be relatively small and that various signal transmission problems are present in borehole exploration of the type described. Accordingly, it is believed that use of the single piezoelectric element/dual port arrangement shown in FIGS. 2 and 3 would be of value in overcoming this problem. The structure shown would additionally lend itself to cable connection; the shield of a coaxial cable could be connected to surface A, and two shielded conductors to surfaces B and C.

However, the present invention is not limited to the sensor shown. Indeed, as noted above it would be ideal if a convenient particle velocity sensor or, failing that, a direct pressure gradient sensor was developed for use in the method of the invention.

FIG. 3 shows certain details of the geophone of FIG. 2. It will be appreciated that the ports 52 communicate with a relatively large cylindrical area disposed entirely around the tube of piezoelectric material 40. The relative sizes of the ports 52, the inner and outer diameters of the circular ring around the piezoelectric tube, and of the orifices 44a and 42a communicating with the center of piezoelectric 40, may all be optimized as understood by those skilled in the art in order to provide the proper impedance to the flow of acoustic wave therein so as to control the bandwidth of the geophone.

Those skilled in the art will also recognize that the pressure geophones 26 shown in FIG. 1 could essentially amount to the upper half of the pressure gradient geophone of FIG. 2, this being in essence a pair of pressure geophones disposed in close proximity to one another and having a common piezoelectric element for ease of balancing, as discussed above.

Finally, those skilled in the art will recognize that there are numerous modifications and improvements which can be made to the tool and to the method of the invention without departing from its essential spirit and scope, which is therefore not to be measured by the disclosure above which is merely exemplary, but by the scope of the following claims.

We claim:

1. A tool for seismic exploration comprising:
   a source of acoustic energy;
   first paired sensor means, comprising means for detecting the flux of acoustic energy through a unit area, paired with means for detecting the absolute pressure, said first paired sensor means being spaced from said source of acoustic energy;
   second paired sensor means comprising means for detecting the flux of acoustic energy through a unit area and means for detecting the absolute pressure, said second paired means being spaced from said source of acoustic energy and from said first pair, and a third means for detection of pressure;

wherein said source of energy and said detectors are spaced from one another along a cable and are adapted to be raised and lowered within a borehole in the earth for seismic exploration purposes.

2. The tool of claim 1 wherein said means for detecting the flux of acoustic energy comprises means for measuring the gradient of pressure exerted by said wave.

3. The tool of claim 2 wherein said means for detecting the gradient of pressure of said acoustic wave comprises a pair of substantially identical pressure sensors disposed in close proximity to one another and spaced along a line substantially connecting said sensors and said source of energy.

4. The tool of claim 3 wherein said pair of pressure sensors share a common piezoelectric sensing element.

5. A method of seismic exploration comprising the steps of:

imparting a burst of acoustic energy to a subterranean formation;

measuring the gradient of acoustic energy flux density at a plurality points spaced at differing distances from said source in a borehole;

determining the attenuation of said energy by comparison of the gradients in energy flux density at said plural points from the source to a plurality of detectors used to measure the gradient of acoustic energy flux density; and determining the nature of the subterranean structure between the plurality of detectors as a function of said attenuation.

6. The method of claim 5 wherein a plurality of such measurements are made wherein the source-to-receiver distances remain constant and said source positions vary a distance less than the shortest of said source-to-receiver distances between successive measurements.

7. The method of determining the lithology of a subterranean region surrounding a borehole comprising the steps of;

measuring the attenuation of an acoustic wave imparted to the earth within said borehole by measuring the gradient of the energy flux density of said acoustic wave at plural locations spaced from the source of acoustic energy within said borehole; and determining said lithology based on said attenuation.

8. The method of claim 7 wherein said gradient of energy flux density is effectively measured by measurement of pressure at closely spaced locations within said borehole.

9. The method of measuring the acoustic wave attenuation coefficient of rock structures comprising the steps of:

drilling a borehole through said structure;

lowering a source of acoustic energy and plural means for detection of energy flux density spaced plural predetermined distances from said source of acoustic energy into said borehole;

transmitting a burst of energy from said source of acoustic energy into said hole;

measuring the energy flux density at said plural distances from said source of acoustic energy;

identifying and comparing said measurements of said flux density to one another;

calculating the attenuation of said wave in said structure based on said comparison; and using the calculated attenuation value to determine the lithology of said structure.

10. The method of claim 9 wherein the energy flux density is measured by means for detecting a pressure gradient.

11. The method of claim 9 wherein said plural means for detecting a pressure gradient are spaced distances from one another less than the distance between said source of acoustic energy and any of said detectors.

* * * * *